R. BOLES.
NUT LOCK.
APPLICATION FILED FEB. 1, 1912.
1,024,307.
Patented Apr. 23, 1912.
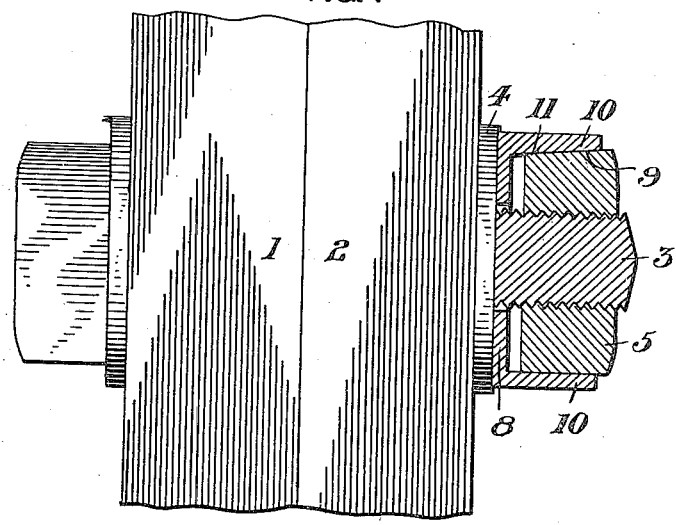
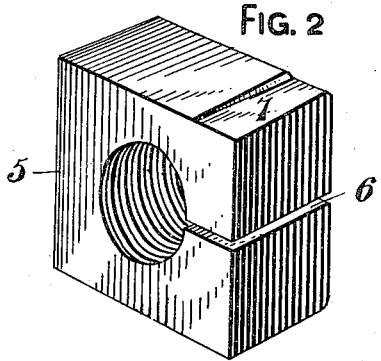
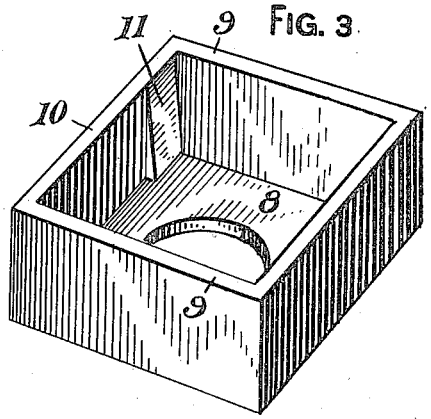

UNITED STATES PATENT OFFICE.

ROBERT BOLES, OF ELDERSVILLE, PENNSYLVANIA.

NUT-LOCK.

1,024,307.  Specification of Letters Patent.  Patented Apr. 23, 1912.

Application filed February 1, 1912.  Serial No. 674,641.

*To all whom it may concern:*

Be it known that I, ROBERT BOLES, a citizen of the United States of America, residing at Eldersville, in the county of Washington and State of Pennsylvania, have invented certain new and useful Improvements in Nut-Locks, of which the following is a specification, reference being had therein to the accompanying drawing.

This invention relates to nut locks, and my invention aims to provide a nut locking device that can be advantageously used in connection with rail joints, bridges, rolling stock and structures subjected to vibrations that have a tendency to displace nuts.

My invention further aims to provide a nut locking device that is simple in construction, durable, easy to apply and highly efficient for the purposes for which it is intended.

The invention still further aims to accomplish the above results by a mechanical construction that will be hereinafter specifically described and then claimed.

Reference will now be had to the drawing, wherein:—

Figure 1 is a side elevation of the nut locking device, partly broken away and partly in section. Fig. 2 is a perspective view of a detached nut, and Fig. 3 is a similar view of a detached washer.

The reference numerals 1 and 2 denote, by way of an example, two pieces of material connected by a bolt 3 and arranged upon the threaded end of said bolt against the piece of material 2 is an ordinary washer 4.

The reference numeral 5 denotes a nut adapted to be screwed upon the bolt 3, said nut having one of the side walls thereof provided with a transverse slot or slit 6, and one of the facets thereof adjoining the slitted wall of the nut cut away to provide a beveled portion 7.

The reference numeral 8 denotes a rectangular washer having integral side walls 9 and 10, the wall 10 having an intergal wedge 11 adjacent to one of the walls 9, the wedge gradually tapering from the washer 8 to the outer edge of the wall 10 and corresponding in width to the cut away beveled portion 7 of the nut 5.

The nut 5 is placed within the washer 8 with the wedge 11 engaging the cut away beveled portion 7 of the nut 5. With the washer upon the nut, said nut is screwed upon the bolt until the washer 8 engages the washer 4. As the nut and washer are tightened the threads of the bolt cause the nut to ride into the washer and during this movement of the washer the wedge 11 engaging the beveled portion 7 of the nut tends to close the slit or slot 6, thereby causing the threads of the nut 5 to clamp the threads of the bolt 3.

From the foregoing it will be observed that the nut locking device can be easily and quickly installed in connection with an ordinary bolt and that the nut locking device can be removed without injury to either the bolt or nut. Furthermore, the washer 8 can be easily stamped or punched from metal and the slitting and cutting away of the nut 5 performed at the same time said nut is provided with a threaded bore.

While in the drawing there is illustrated a preferred embodiment of the invention, it is to be understood that the structural elements are susceptible to such changes as fall within the scope of the appended claim.

What I claim is:—

In a nut locking device, the combination with a bolt, of a washer, integral walls carried thereby, a wedge carried by the inner side of one of said walls, a slit nut arranged in said washer and having a beveled facet engaged by the wedge of said washer, said nut and said washer being screwed upon said bolt whereby said washer will clamp said nut upon said bolt.

In testimony whereof I affix my signature in the presence of two witnesses.

ROBERT BOLES.

Witnesses:
 E. D. BELL,
 N. R. CRISS.